(12) United States Patent
Meiser et al.

(10) Patent No.: US 10,507,557 B2
(45) Date of Patent: Dec. 17, 2019

(54) ACCESSORY FOR A HAND-HELD POWER TOOL

(71) Applicant: Robert Bosch GmbH, Stuttgart (DE)

(72) Inventors: Charlotte Meiser, Kernen Im Remstal (DE); Hardy Schmid, Stuttgart (DE); Jan-Simon Blind, Steinenbronn (DE); Rudi Habermann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/961,558

(22) Filed: Apr. 24, 2018

(65) Prior Publication Data

US 2018/0311778 A1 Nov. 1, 2018

(30) Foreign Application Priority Data

Apr. 26, 2017 (DE) .................. 10 2017 206 975

(51) Int. Cl.
*B23Q 11/02* (2006.01)
*B23Q 11/00* (2006.01)
*B25D 17/20* (2006.01)

(52) U.S. Cl.
CPC ...... *B23Q 11/0071* (2013.01); *B23Q 11/0046* (2013.01); *B25D 17/20* (2013.01); *B23B 2270/62* (2013.01)

(58) Field of Classification Search
CPC . B23B 2251/68; B23B 2270/62; B23B 47/34; B23Q 11/0046; B23Q 11/006; B23Q 11/005; B23C 2230/045; B23C 2230/08; Y10T 408/453; Y10T 408/50
USPC .......................... 408/67, 14, 15, 83.5, 97, 110
See application file for complete search history.

(56) References Cited

U.S. PATENT DOCUMENTS

| | | | | |
|---|---|---|---|---|
| 1,023,594 | A | | 4/1912 | Prellwitz |
| 2,527,968 | A | * | 10/1950 | Sherman ............ B23Q 11/0046 29/DIG. 79 |
| 4,051,880 | A | * | 10/1977 | Hestily .............. B23Q 11/0046 144/154.5 |
| 4,822,219 | A | * | 4/1989 | Wood .................... B23Q 3/002 144/252.1 |
| 5,034,041 | A | * | 7/1991 | Austin ............... B23Q 11/0046 144/252.1 |
| 5,069,695 | A | * | 12/1991 | Austin ............... B23Q 11/0046 144/252.1 |
| 7,455,486 | B2 | * | 11/2008 | Britz ....................... A47L 9/102 175/213 |
| 2002/0129949 | A1 | * | 9/2002 | Bongers-Ambrosius .................... B08B 15/04 173/217 |
| 2014/0027139 | A1 | * | 1/2014 | Hideta ............... B23Q 11/0046 173/198 |

(Continued)

FOREIGN PATENT DOCUMENTS

| | | |
|---|---|---|
| DE | 1210376 B | 2/1966 |
| DE | 196 03 528 A1 | 8/1997 |
| EP | 2 067 553 A1 | 6/2009 |

*Primary Examiner* — Nicole N Ramos
(74) *Attorney, Agent, or Firm* — Maginot, Moore & Beck LLP

(57) ABSTRACT

An accessory for a hand-held power tool has a first air channel and a second air channel. In the first air channel, a first air stream for transporting dust particles is routed into a dust-collecting box. In the second air channel, a second air stream for transporting dust particles into the dust-collecting box or into a further dust-collecting box is routed.

20 Claims, 9 Drawing Sheets

(56) References Cited

U.S. PATENT DOCUMENTS

2016/0031054 A1\* 2/2016 Chang ................ B23Q 11/0046
144/252.1
2017/0087707 A1\* 3/2017 Appel ..................... B23B 47/34

\* cited by examiner

ACCESSORY FOR A HAND-HELD POWER TOOL

This application claims priority under 35 U.S.C. § 119 to patent application number DE 10 2017 206 975.9, filed on Apr. 26, 2017 in Germany, the disclosure of which is incorporated herein by reference in its entirety.

BACKGROUND

DE 19603528 describes a hand-held power tool having a tool holder into which to insert a suction-extraction tool provided with a suction-extraction channel. The hand-held power tool has a suction-extraction device with a suction chamber, into which the suction-extraction channel opens out when the tool is inserted.

SUMMARY

The disclosure relates to an accessory for a hand-held power tool. The accessory has a first air channel, in which a first air stream for transporting dust particles is routed into a dust-collecting box. It is proposed that the accessory should have a second air channel, in which a second air stream for transporting dust particles is routed into the dust-collecting box or into a further dust-collecting box. It is advantageously possible for the second air channel to realize more effective suction extraction of dust particles at the site of use of the hand-held power tool. The accessory is designed, in particular, in the form of a retrofittable suction-extraction means for removing dust particles at the site of use of the hand-held power tool during operation of the hand-held power tool and for accommodating said dust particles in the dust-collecting box. The hand-held power tool is, in particular, a hand-held power tool in the case of which, as a machining surface is being machined, material is removed from said surface. For example, the hand-held power tool may be a drill, an impact wrench or a hammer drill. The accessory is connected in particular in a releasable manner to the hand-held power tool. A releasable connection is intended to mean, in particular, a connection which is releasable in a tool-free manner. The accessory is connected to the hand-held power tool at least mechanically, for example via a force-fitting and/or form-fitting connection. In particular, the accessory is connected, in addition, electrically to the hand-held power tool, for example via at least one electrical contact element arranged on a coupling region of the accessory. The accessory can advantageously be supplied with power by the at least one electrical contact element. The dust particles are transported into the dust-collecting box from the site of use of the hand-held power tool by means of the first and of the second air channels. During operation of the hand-held power tool and/or of the accessory, an air stream flows into the dust-collecting box from the site of use of the hand-held power tool via the air channels. The air stream can be generated both by the accessory and by the hand-held power tool. The dust-collecting box has at least one opening, through which the dust particles can be accommodated in the dust-collecting box. The dust-collecting box also has an inlet opening, through which the air stream can be routed into the dust-collecting box, and an outlet opening, through which the filtered air stream leaves the dust-collecting box. In the dust-collecting box, the dust particles are filtered from the air stream by means of a filter unit. The filter unit is arranged preferably in the region of the outlet opening. The filter unit has at least one filter element, which may be designed, for example, in the form of a folded filter. The air channels each have an inlet region, through which an air stream enters into the air channel, and at least one outlet region, via which the air stream leaves the air channel. Between the inlet and outlet regions, the air channels are of essentially closed design. In this context, "closed design" is intended to mean, in particular, the at least 75%, advantageously at least 90%, preferably at least 99% of the air stream which enters into the air channels via the inlet opening leaves the air channels via the outlet opening or is routed into the dust-collecting box. The first and the second air channels are designed to be separate from one another at least to some extent, in particular along at least 50% of their length between their respective inlet region and the dust-collecting box.

It is also proposed that the first air channel should be designed so that dust particles exiting from the drill hole are transported directly, and the second air channel should be designed so that dust particles from the drill hole are transported via an at least to some extent hollow insertion tool. It is thus advantageously possible for dust particles to be accommodated, and extracted by suction, both within and outside the drill hole. The hollow insertion tool is designed, in particular, in the form of a suction drill bit which, in the region of the drill head, has at least one opening, which is designed to route an air stream into a suction-extraction channel within the insertion tool. The suction-extraction channel advantageously extends centrally along the longitudinal axis of the insertion tool. The air stream leaves the insertion tool via a suction-extraction opening, which is arranged outside the operating region of the insertion tool, in particular on the shank of the insertion tool.

It is also proposed that an inlet region of the first air channel should be designed to be axially movable relative to an inlet region of the second air channel. It is thus advantageously possible to ensure a constantly reliable extraction of dust by suction during use of the hand-held power tool. The inlet regions of the air channels are formed, in particular, by a first and a second suction head. The suction heads are advantageously connected in a releasable manner to the accessory, and therefore the suction heads are interchangeable and can be adapted to different insertion tools. During operation, the insertion tool of the hand-held power tool is enclosed preferably at least to some extent, in particular fully, by the first and/or by the second suction head, so that as far as possible all the dust particles are routed into the air channels. The first suction head is arranged on a telescopic unit of the accessory, the telescopic unit having a telescopic element mounted in an axially movable manner in the housing. It is thus advantageously possible to ensure that the first suction head is at a constant distance from the site of use of the insertion tool, in particular is in constant abutment against the machining surface.

It is additionally proposed that the first air channel and the second air channel should open out in a common air channel upstream of the dust-collecting box, as seen in the flow direction of the air stream. It is thus advantageously possible to realize a particularly compact accessory construction.

It is also proposed that the air stream should be generated by a fan unit, which has at least one fan element. Optimum transportation of the dust particles can advantageously be realized by the fan unit.

It is also proposed that the fan unit should have the fan element and a further fan element, which differ in terms of their fan characteristic curves. It is thus advantageously possible to realize particularly efficient transportation of the dust particles. A fan characteristic curve is intended to mean mutual dependency of the increase in pressure and volumetric flow rate generated by a fan element. An operating point of the fan element installed in a system is achieved from the point of intersection of the fan characteristic curve and of a system characteristic curve, which is achieved essentially from the flow resistance within the air channel of the system. The operating point of the first fan element is advantageously optimized for a high volumetric flow rate and the operating point of the second fan element is advantageously optimized for a high pressure. In this context, "optimized" is intended to mean, in particular, that, in the case of the second fan element being installed in place of the first fan element, the operating point of the second fan element results in a lower volumetric flow rate than the operating point of the first fan element.

It is additionally proposed that the fan element and/or the further fan element should be arranged in the hand-held power tool. It is thus advantageously possible to realize a particularly compact accessory.

It is also proposed that the fan element and the further fan element should be driven by an electric motor of the hand-held power tool. It is thus advantageously possible to realize a cost-effective drive for the fan unit. The fan element and/or the further fan element may be arranged, for example, in a rotationally fixed manner on the motor shaft of the hand-held power tool. As an alternative, the fan element and/or the further fan element may be coupled in a rotationally fixed manner to the motor shaft. In particular, at least one of the fan elements is coupled to the motor shaft via a transmission unit.

It is also proposed that at least the fan element of the fan unit should be arranged in the accessory. It is thus advantageously possible for the suction extraction to be further optimized. It is preferable for the fan element to be arranged in the accessory and for the further fan element to be arranged in the hand-held power tool. In particular, the accessory has an electric motor, which is designed to drive the fan element and/or the further fan element.

It is additionally proposed that it should be possible to regulate or control the volumetric flow rate in the first air channel and/or in the second air channel. It is thus advantageously possible for the volumetric flow rate and therefore the efficiency of the transportation of the dust particles to be adapted in an application-specific manner. In particular, it is possible to regulate or control the volumetric flow rate in the first air channel and/or in the second air channel such that the volumetric flow rate present in the first air channel is higher in a first drilling phase than in a second drilling phase. The pressure present in the second air channel is preferably higher in the second drilling phase than in the first drilling phase. The first drilling phase here begins in particular during start up or when drilling of the drill hole commences. The second drilling phase begins after the first drilling phase. In particular, the second drilling phase begins once a drill head of the insertion tool has penetrated into the drill hole or into the machining surface. The second drilling phase preferably begins once the drill head has penetrated at least 1 cm into the drill hole.

It is also proposed that the fan unit should be of adjustable design. It is thus advantageously possible for the fan unit to be adapted in an application-specific manner to a high volumetric flow rate or a high pressure. The fan unit is preferably coupled mechanically to an adjustment unit. It is advantageously possible for the characteristic curve of the fan unit, in particular of at least one of the fan elements of the fan unit, to be adapted via the adjustment unit.

It is also proposed that at least one air channel should have an adjustment element, which is designed to reduce the flow cross section in the air channel or to block the air stream in the air channel. It is thus advantageously possible for the volumetric flow rate in the first and/or in the second air channel to be adapted in a straightforward manner. At least one air channel may have, for example, a controllable throttle cap, via which the flow cross section can be adjusted.

It is also proposed that the first air channel and/or the second air channel should be connected in an at least to some extent releasable manner to the accessory. It is, for example, conceivable for the first and/or the second suction head to be connected to the accessory so as to be releasable in a tool-free manner. The first and/or second suction head, which are/is releasable in a tool-free manner, are/is preferably designed such that they/it can be changed over for a compact closure element, it therefore not being possible for any air stream to penetrate into the first and/or second air channel. As an alternative, or in addition, it is conceivable for a hose element, which connects the suction head to the accessory, to be fastened on the accessory so as to be releasable in a tool-free manner and preferably likewise to be able to be changed over for a compact closure element.

It is also advantageously possible for this measure to adapt the accessory to application cases in which there is no need for any suction extraction at the drill hole or via a suction drill bit.

The disclosure additionally relates to a hand-held power tool having an accessory as described above.

BRIEF DESCRIPTION OF THE DRAWINGS

Further advantages can be gathered from the following description of the drawings. The drawings and the description contain numerous features in combination. A person skilled in the art will expediently also consider the features individually and combine them to give further advantageous combinations. The different embodiments shown provide like features with like reference signs. Features which have a similar function are indicated by an additional letter in the reference sign.

In the drawings.

DETAILED DESCRIPTION

Figure 1A:
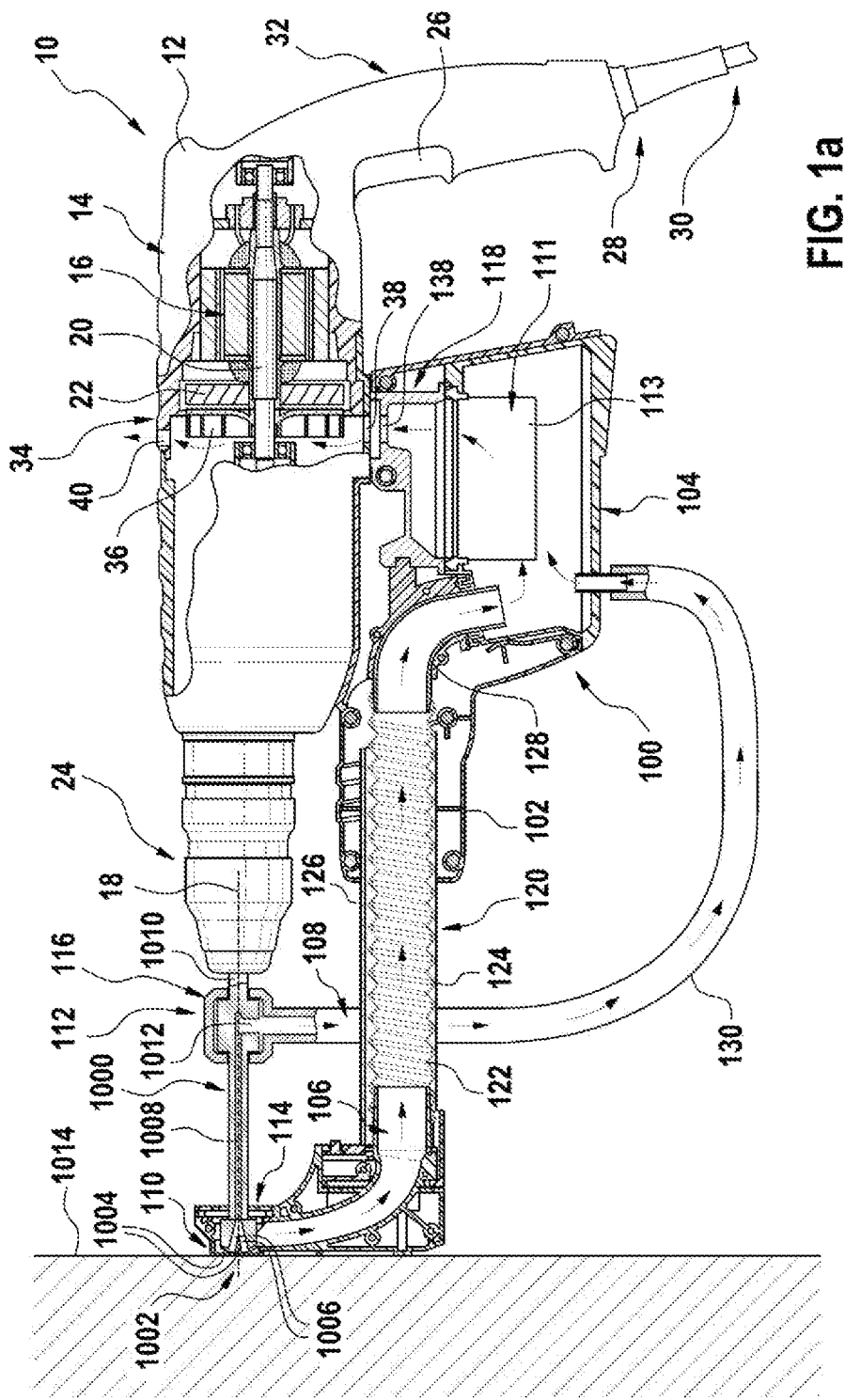
FIG. 1a shows a longitudinal section of a first embodiment of an accessory with a hand-held power tool.
Figure 1B:
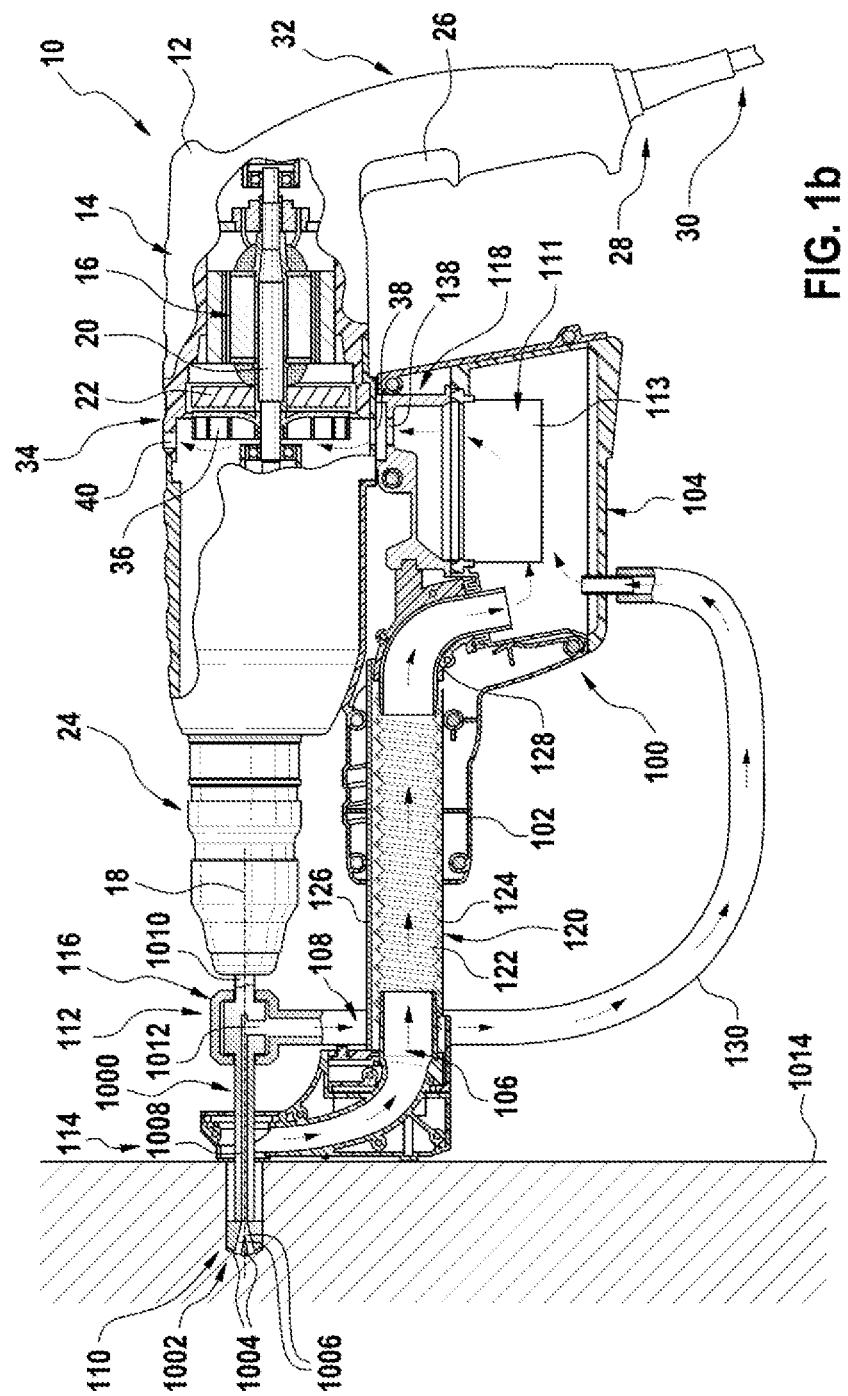
FIG. 1b shows a longitudinal section of the first embodiment of the accessory with the hand-held power tool during the drilling operation.

FIG. 1a and FIG. 1b show a longitudinal section of an accessory 100 connected in a releasable manner to a hand-held power tool 10. The hand-held power tool 10 has a housing 12, which is designed, in particular, in the form of an outer housing. The hand-held power tool 10 is designed, for example, in the form of a hammer drill. The hand-held power tool 10 has a drive unit 14, which is designed to use a transmission unit (not illustrated) to drive an insertion tool 1000 with rotary and/or percussive action. For this purpose, the drive unit 14 of the hand-held power tool 10 has an electric motor 16, of which the axis of rotation is arranged essentially parallel to a working axis 18 of the hand-held power tool 10. During operation of the hand-held power tool 10, the insertion tool 1000 is driven with rotary action around, and/or with percussive action along, the working axis 18. The electric motor 16 has a shaft 20, which is connected in a rotationally fixed manner to a motor-fan element 22 for the purpose of cooling the electric motor 16. The drive unit 14 has, in particular, a percussion mechanism (not illustrated). The insertion tool 1000 is accommodated by the hand-held power tool 10 via a tool holder 24. The tool holder 24 is designed, for example, in the form of an interchangeable drill chuck. However, it is also conceivable for the tool holder 24 to be designed in the form of a non-interchangeable, fixed drill chuck. The hand-held power tool 10 has an operating switch 26, wherein the hand-held power tool 10 can be switched on or off via actuation of the operating switch 26. The hand-held power tool 10 has a power-supply unit 28, which is designed to supply the hand-held power tool 10 with power. The power-supply unit 28 comprises a power connection 30, which is fastened on the housing 12 of the hand-held power tool 10. The housing 12 has a handle region 32, on which the operating switch 26 is arranged. The hand-held power tool 10 also comprises a fan unit 34, which is designed to generate an air stream during operation of the hand-held power tool 10, it being possible for dust particles to be transported away from the site of use of the insertion tool 1000 via said air stream. The fan unit 34 comprises a fan element 36, which is arranged in a rotationally fixed manner on the shaft 20 of the electric motor 16 of the hand-held power tool 10. The fan element 36 is designed, for example, in the form of a radial fan and can be formed in one piece with the motor-fan element 22.

The insertion tool 1000 is designed in the form of a suction drill bit. A plurality of cutting edges 1004 are arranged on a drill head 1002 of the insertion tool 1000. Between the cutting edges 1004, the insertion tool 1000 has intake openings 1006, which lead into a central suction-extraction channel 1008 within the insertion tool 1000. Adjacent to that region of the insertion tool 1000 which can be accommodated by the tool holder 24 of the hand-held power tool 10, at least one suction-extraction opening 1012 is arranged in a shank 1010 of the insertion tool 1000, said suction-extraction opening being designed in the form of a transverse bore and projecting into the suction-extraction channel 1008. FIG. 1a shows the insertion tool 1000 in the first drilling phase. The insertion tool 1000 acts from the outside on a machining surface 1014 in the form of a wall. During operation of the hand-held power tool 10, the insertion tool 1000 is driven with rotary and/or percussive action, and therefore the cutting edges 1004 comminute the stone material and the insertion tool 1000 penetrates into the machining surface 1014.

The accessory 100 is designed so as to extract by suction the dust particles released. The accessory 100 has a housing 102, which is connected in a releasable manner to the housing 12 of the hand-held power tool 10. A dust-collecting box 104, in which the dust particles are collected, is inserted in a releasable manner in the accessory 100. The dust particles are received from the accessory 100, and transported into the dust-collecting box 104, via a first air channel 106 and a second air channel 108. The dust particles are transported via an air stream generated by the fan unit 34 of the hand-held power tool 10. In order that the dust particles do not leave the dust-collecting box 104, a filter unit 111 is connected in particular in a releasable manner to the dust-collecting box 104. The filter unit 111 comprises a filter element 113 designed, for example, in the form of a folded filter.

The housing 102 of the accessory 100 and the housing 12 of the hand-held power tool 10 have corresponding air-passage openings 38, 138, via which the fan unit 34, which is arranged in the hand-held power tool 10, can be flow-connected to the air channels 106, 108 of the accessory 100. The air stream generated by the fan unit 34 enters, in the flow direction of the air stream, into the first air channel 106 and the second air channel 108 of the accessory 100 via inlet regions 110, 112, in which a respective suction head 114, 116 is arranged. The air stream leaves the accessory 100 via an outlet region 118, wherein the outlet region 118 is formed by the air-passage opening 138. In the state in which the accessory has been connected to the hand-held power tool 10, the air-passage opening 138 of the accessory 100 is connected to the air-passage opening 38 of the hand-held power tool 10 such that the air stream can be routed into the hand-held power tool 10 from the accessory 100. The air-passage opening 38 of the hand-held power tool 10 is arranged in the region of the fan unit 34. Within the hand-held power tool 10, the air stream taken in from the fan unit 34 is routed outward via an air outlet 40, which is designed in the form of an opening on the upper side of the housing 12 of the hand-held power tool 10.

During use of the hand-held power tool 10, the first suction head 114 of the first air channel 106 butts against the machining surface 1014 such that the dust particles or stone material released from the machining surface 1014 can be received directly by the suction head 114. In particular, the suction head 114 comprises an opening, through which the insertion tool 1000 is guided. In the region of the opening, the insertion tool 1000 is enclosed preferably fully by the first suction head 114, so that all the dust particles can be accommodated in the first suction head 114. The distance between the first suction head 114 and the hand-held power tool 10, in particular the tool holder 24 of the hand-held power tool 10, is designed to be variably adjustable via a telescopic unit 120, which is assigned to the accessory 100. The first suction head 114 is designed in the form of a first portion of the first air channel 106. A second portion of the first air channel 106 is formed by an elastic hose element 122, which incorporates a metallic coil 124. The hose element 122 is mounted radially in a telescopic element 126 of the telescopic unit 120, wherein the telescopic element 126 is mounted in an axially movable manner in the housing 102 of the accessory 100. At a first end, the hose element 122 is connected to the first suction head 114. At a second end, the hose element 122 encloses an elbow element 128, which forms a third and final portion of the first air channel 106. The first air channel 106 is connected to the dust-collecting box 104 downstream of the elbow element 128, as seen in the flow direction.

The second suction head 116 of the second air channel 108 can be fixed preferably in an axially immovable manner in the region of the suction-extraction opening 1012 of the insertion tool 1000 in such a manner, which during operation of the hand-held power tool 10, dust particles within the drill hole can be extracted by suction via the intake openings 1006 of the insertion tool 1000. The air stream generated by the fan unit 34 transports the dust particles directly into the dust-collecting box 104 via the suction-extraction channel 1008 of the insertion tool 1000 and the second air channel 108 of the accessory 100, said second air channel being connected to the suction-extraction channel 1008 via the suction-extraction openings 1012. The second suction head 116 and the insertion tool 1000 are connected to one another in a form-fitting manner along the working axis 18 for axial-mounting purposes. The second suction head 116 is connected to the dust-collecting box 104 via a further hose element 130. The further hose element 130 is connected in a releasable manner to the dust-collecting box 104 in particular by a force fit. In a manner analogous to the hose element 122 of the first air channel 106, the further hose element 130 is formed to some extent from a plastics material, in which a metallic coil is installed. A small amount of radial play is preferably formed between the second suction head 116 of the second air channel 108 and the insertion tool 1000, and it is therefore not possible, during operation of the hand-held power tool 10, for essentially any torque to be transmitted from the rotating insertion tool 1000 to the second air channel 108.

FIG. 1*b* shows the insertion tool 1000 in the second drilling phase. In the second drilling phase, the drill head 1002 of the insertion tool 1000 has penetrated all the way into the drill hole. In the first drilling phase, a significant fraction of the dust particles is extracted by suction both via the first air channel 106 and via the second air channel 108. In the second drilling phase, the dust particles are extracted by suction essentially solely via the insertion tool 1000, designed in the form of a suction drill bit, and the second air channel 108.

Figure 1C:
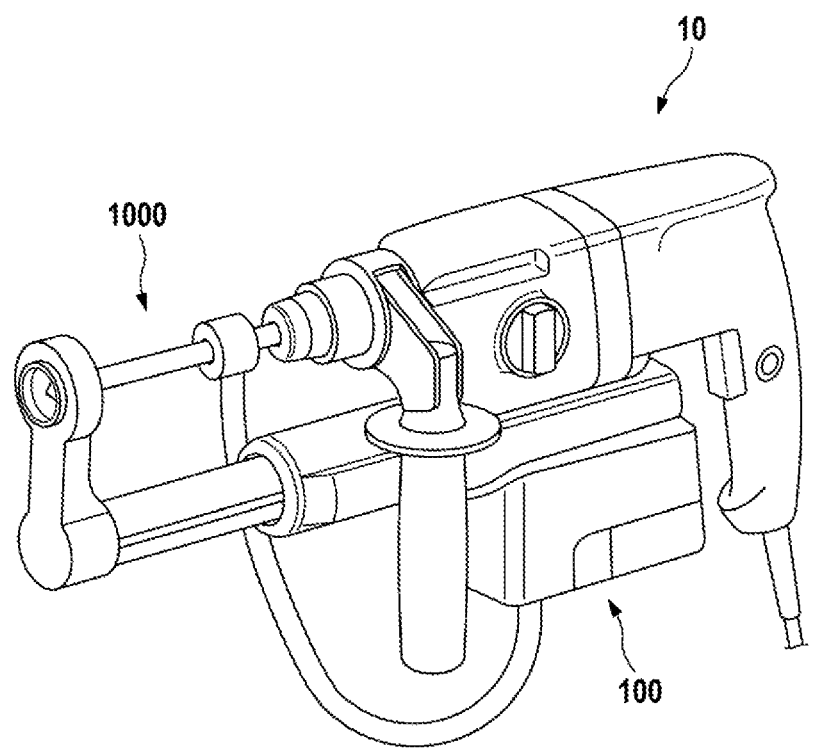
FIG. 1c shows a perspective view of the first embodiment of the accessory with the hand-held power tool.

FIG. 1*c* shows a perspective view of the hand-held power tool 10 having the accessory 100.

Figure 2:
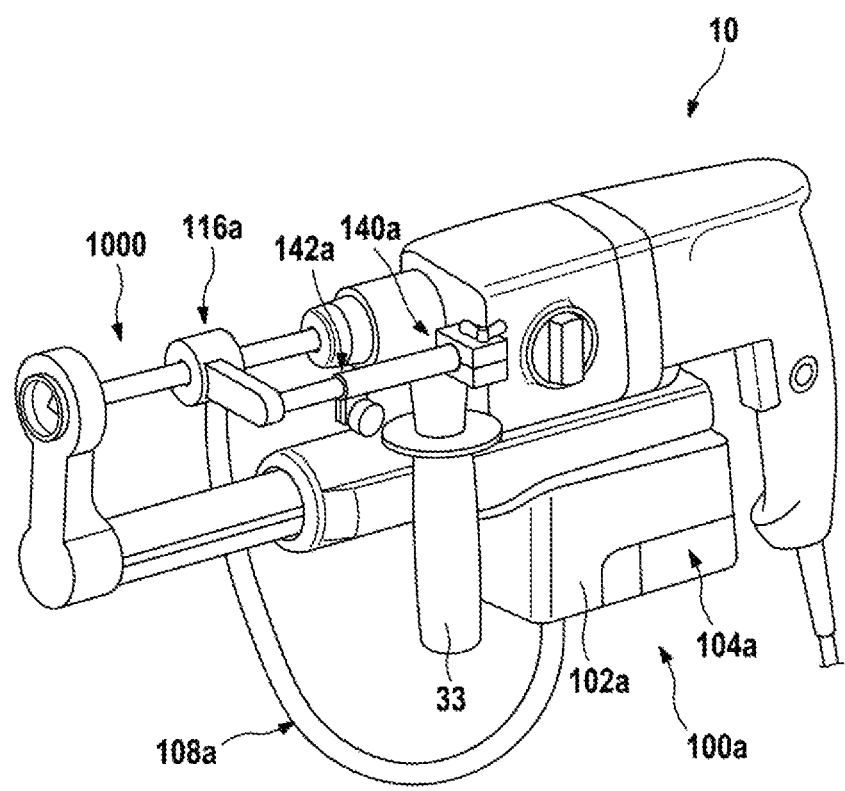
FIG. 2 shows a perspective view of a second embodiment of the accessory with the hand-held power tool.

FIG. 2 shows a second embodiment of an accessory 100*a*. The accessory 100*a* differs from the accessory 100, which is shown in FIG. 1, in that the second air channel 108*a* can be fastened on the hand-held power tool 10 via an additional fastening device 140*a*. As an alternative, it is likewise conceivable for the additional fastening device 140*a* to fasten the second air channel 108*a* on the housing 102*a* of the accessory 100*a*. The second channel 108*a*, as described above, has its end connected to the insertion tool 1000 and the dust-collecting box 104*a*. The additional fastening device 140*a* is arranged between said two end fastenings of the second air channel 108*a*, the additional fastening device being designed, in particular, to fix the second suction head 116*a* axially in a rotationally fixed manner around the insertion tool 1000. The additional fastening device 140*a* advantageously comprises a further telescopic unit 142*a* for fixing the second suction head 116*a* in an axially adjustable manner. The further telescopic unit 142*a* is fastened in a releasable manner for example on an additional handle 33 of the hand-held power tool 10.

Figure 3:
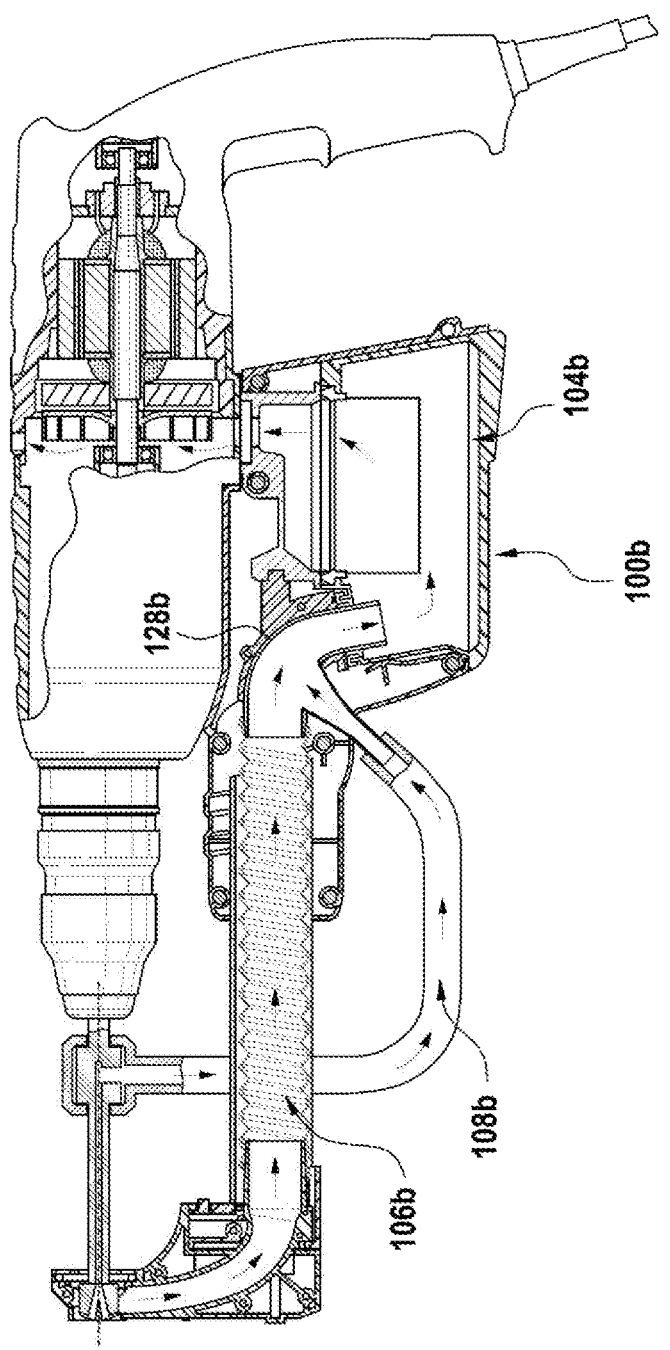
FIG. 3 shows a longitudinal section of a third embodiment of the accessory with the hand-held power tool.

FIG. 3 shows a third embodiment of an accessory 100*b*. The accessory 100*b* differs from the accessory 100, which is shown in FIG. 1, in that, prior to entering into the dust-collecting box 104*b*, the second air channel 108*b* opens out into the first air channel 106*b*. In particular, the second air channel 108*b* opens out in a region of the first air channel 106*b* in which the first air channel 106*b* is mounted in an immovable manner. For example, the second air channel 108*b* opens out into the elbow element 128*b*.

Figure 4:
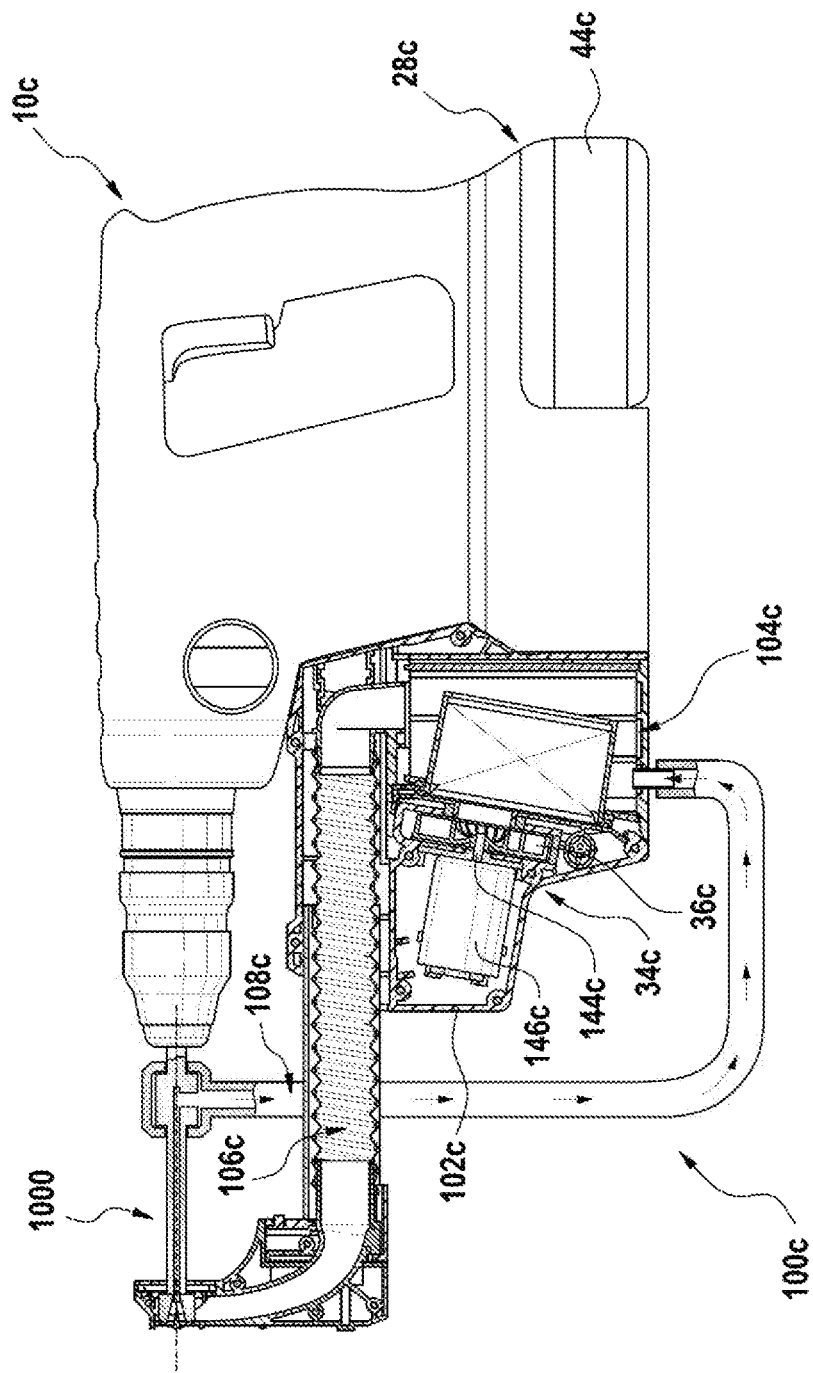
FIG. 4 shows a longitudinal section of a fourth embodiment of the accessory.

FIG. 4 shows a fourth embodiment of an accessory 100*c*, the fan unit 34*c* here being arranged in the accessory 100*c*. The fan unit 34*c* has a fan element 36*c*, which is connected in a rotationally fixed manner to a shaft 144*c* of an electric motor 146*c* of the accessory 100*c*. The fan element 36*c* is designed in the form of a radial fan, which is arranged adjacent to the dust-collecting box 104*c* in the housing 102*c* of the accessory 100*c*. In a manner analogous to the previous embodiments, the air stream generated by the fan unit 34*c* is routed into the dust-collecting box 104*c* via the first air channel 106*c* and the second air channel 108*c*. The air stream taken in axially from the fan element 36*c* is expelled radially via laterally openings in the housing 102*c* of the accessory 100*c*. In this embodiment, the electric motor 146*c* is supplied with power via the power supply 28*c* of the hand-held power tool 10*c*, this comprising, for example, an interchangeable rechargeable battery pack 44*c* for the hand-held power tool. For the purposes of mechanical and electrical connection, the accessory 100*c* and the hand-held power tool 10*c* have mutually corresponding connecting elements, which are not illustrated specifically.

Figure 5A:
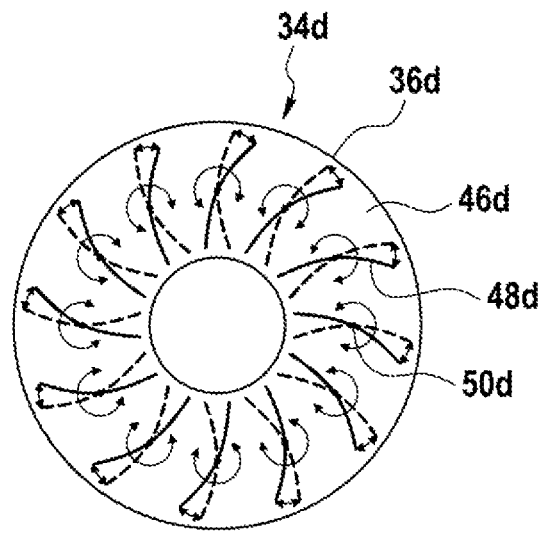
FIG. 5a shows one embodiment of a fan unit.

In the embodiments described in FIGS. 1 to 4, the fan unit 34 has a respective fan element 36, which generates both the air stream in the first air channel 106 and the air stream in the second channel 108. In order to ensure an optimum suction-extraction result, that embodiment of the fan unit 34*d* which is shown in FIG. 5*a* has an adjustable fan element 36*d*. The fan element 36*d*, as described above, can be connected in a rotationally fixed manner to the shaft 20 of the electric motor 16. The fan element 36*d* is designed, for example, in the form of an impeller 46*d* with adjustable blade elements 48*d*. The blade elements 48*d* are mounted for adjustment about a pivot axis 50*d* via a mechanism which has not been illustrated. In dependence on the orientation of the adjustable blade elements 48*d*, it is possible to adapt a fan characteristic curve of the fan unit 34*d*, in particular a fan characteristic curve of the fan element 36*d*. During transition from the first drilling phase into the second drilling phase, the adjustable blade elements 48*d* are advantageously pivoted such that the volumetric flow rate is reduced, this resulting in an increase in pressure in the air channels 106, 108, in particular in the second air channel 108.

The blade elements 48*d* can be adjusted manually or automatically. For example, it is conceivable for the blade elements 48*d* to be adjusted manually by the user, who, upon transition into the second drilling phase, actuates a mechanical actuating element, which is mechanically coupled directly or indirectly to the blade elements 48*d*. As an alternative, it is also conceivable to have manual adjustment in which an electric actuating element is actuated, it being possible for the electric actuating element to provide electronic control for an adjustment unit (not illustrated) which, in turn, is designed for adjusting the blade elements 48*d* mechanically. As an alternative, or in addition, it is also conceivable for the hand-held power tool 10 or the accessory 100 to have an electronic unit, which is designed to differentiate between the operation of the hand-held power tool in the first drilling phase and the operation of the hand-held power tool in the second drilling phase. The electronic unit can achieve the differentiation, for example, via optical, acoustic or other parameters which are known to a person skilled in the art and can be detected via sensors. The electronic unit preferably controls a mechanical adjustment unit automatically in dependence on a first drilling phase or a second drilling phase being determined.

Figure 5B:
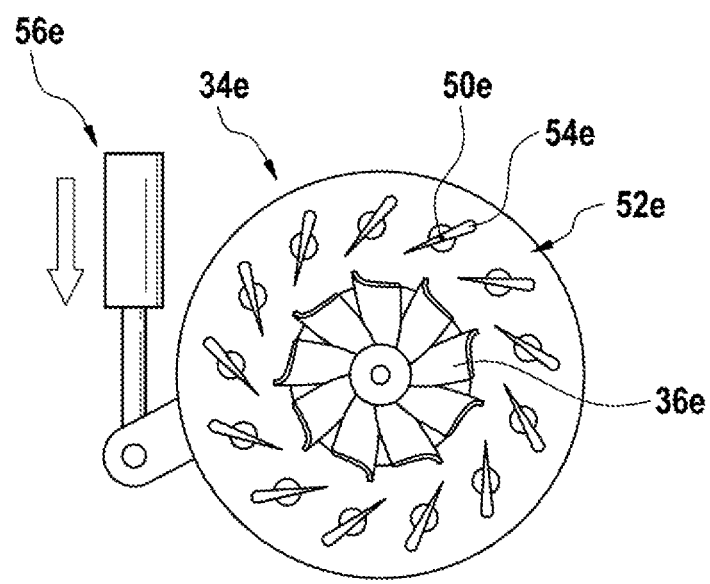
FIG. 5b shows an alternative embodiment of a fan unit.

FIG. 5*b* shows an alternative embodiment of the fan unit 34*e*. The fan unit 34*e* comprises a fan element 36*e*, which is enclosed by an air-directing ring 52*e*. The air-directing ring 52 is designed to adapt the quantity of air which flows in the direction of the fan element 36*e* and which flows radially outward from the fan element 36*e*. In particular, the air-directing ring 52*e* has adjustable air-directing elements 54*e*, which can be rotated about a pivot axis 50*e* via an adjustment unit 56*e*. The air-directing elements 54*e* can be adjusted manually or automatically in a manner analogous to the adjustment of the blade elements 48*d* in the previous exemplary embodiment.

Figure 6:
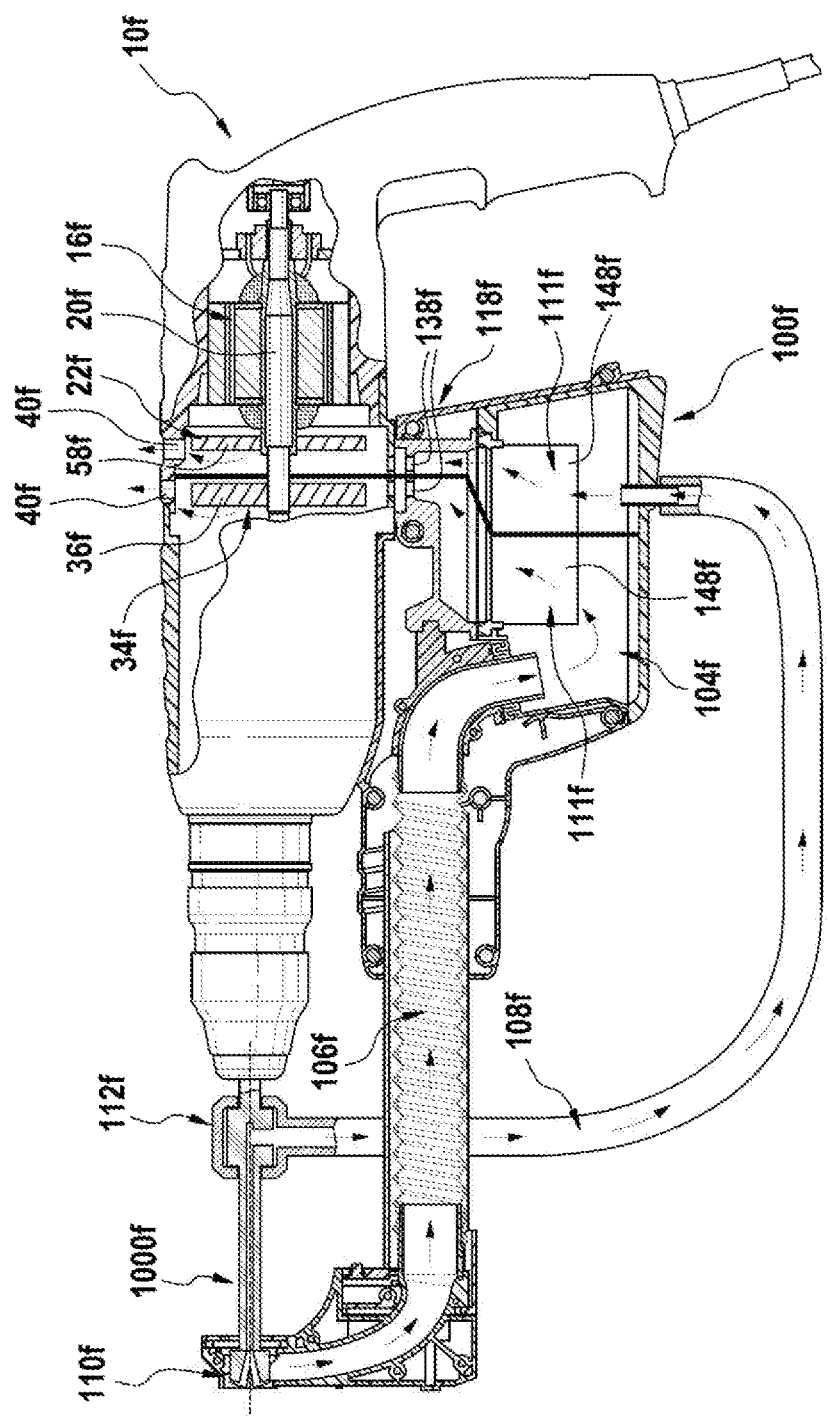
FIG. 6 shows a longitudinal section of a fifth embodiment of the accessory with the hand-held power tool.

FIG. 6 shows a further embodiment of the accessory 100*f*. In this embodiment, the first air channel 106*f* and the second air channel 108*f* are designed to be separate from one another from the respective inlet regions 110*f*, 112*f* to the outlet region 118*f*. In particular, the outlet region 118*f*, for each of the air channels 106*f*, 108*f*, has at least one air-passage opening 138*f*. The fan unit 34*f* for generating the air stream is arranged in the hand-held power tool 10*f* and is driven via the shaft 20*f* of the electric motor 16*f* of the hand-held power tool 10*f*. The electric motor 16*f* is cooled via a motor-fan element 22*f*. The fan unit 34*f* has, in particular, a fan element 36*f* for generating an air stream in the first air channel 106*f* and a further fan element 58*f* for generating an air stream in the second air channel 108*f*.

In the state in which the accessory 100*f* has been connected to the hand-held power tool 10*f*, the two air streams are routed from the accessory 100*f* into the hand-held power tool 10*f* separately via in each case at least one air-passage opening 38*f*, the air-passage openings 38*f* corresponding to the in each case at least one air-passage openings 138*f* of the two air channels 106*f*, 108*f* of the accessory 100*f*. Within the housing 12*f* of the hand-held power tool 10*f*, the two air streams generated by the fan elements 36*f*, 58*f* are routed separately from one another as far as in each case at least one air outlet 40*f*. Since the air streams in the first air channel 106*f* and in the second air channel 108*f* are designed to be separate from one another from the inlet regions 110*f*, 112*f* of the accessory 100*f* to the air outlets 40*f*, the fan unit 34*f* can adapt the air streams separately from one another in respect of optimum suction-extraction performance. In particular, the fan element 36*f* is designed to provide a high volumetric flow rate within the first air channel 106*f*. The further fan element 58*f* is preferably designed to provide a high pressure within the second air channel 108*f*. The accessory has a first dust-collecting box 104*f*, which receives the dust particles from the first air channel 106*f*, and a further dust-collecting box 148*f* which receives the dust particles from the second air channel 108*f*. The two dust-collecting boxes 104*f*, 148*f* can be connected in a releasable manner, jointly or individually, to the housing 102*f* of the accessory 100*f*. The dust-collecting boxes 104*f*, 148*f* each have a filter unit 111*f*.

Figure 7:
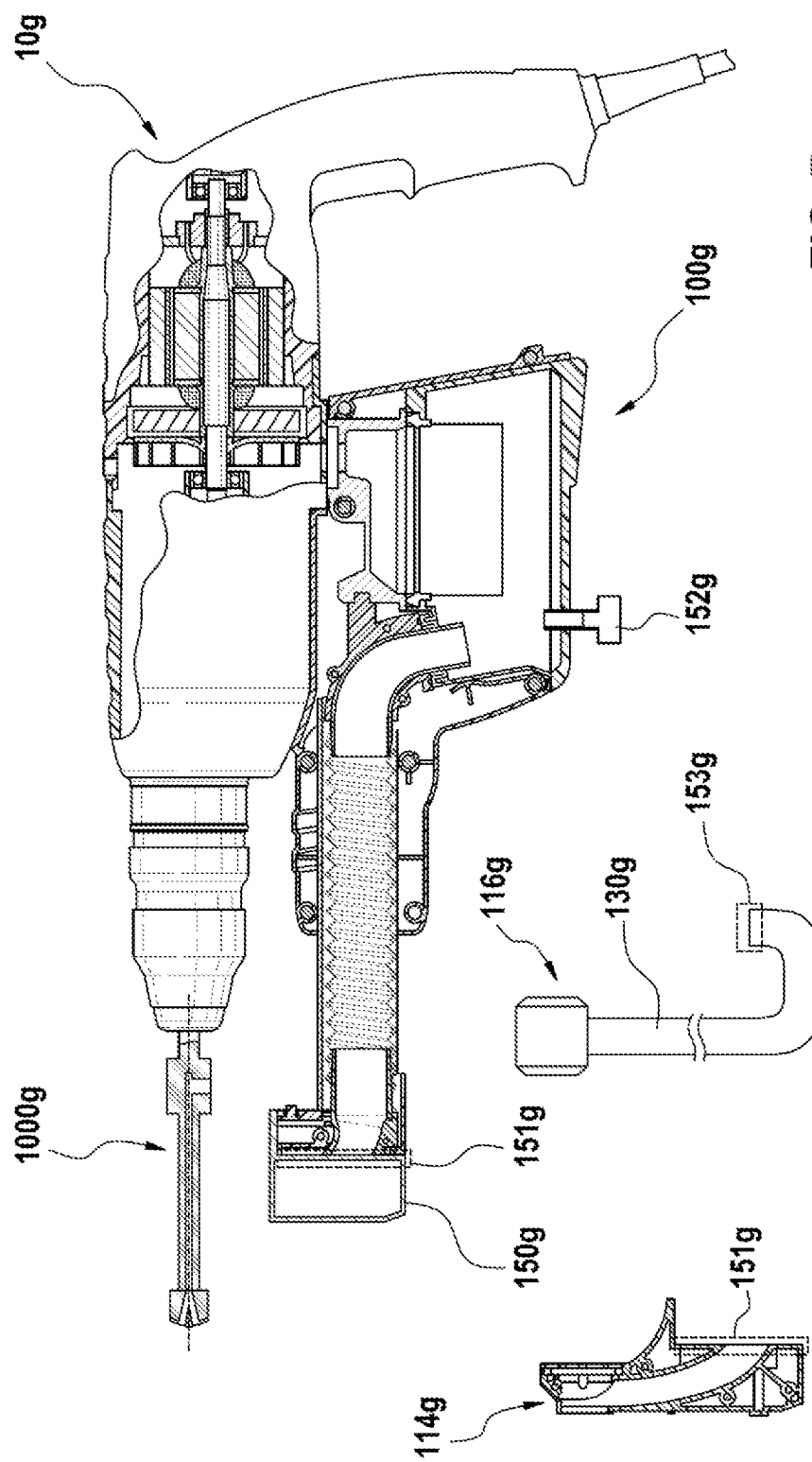

FIG. 7 shows the hand-held power tool 10 having a further embodiment of the accessory 100*g*. In contrast to the embodiment according to FIG. 1, this embodiment has the first air channel 106*g* and the second air channel 108*g* connected in an at least to some extent releasable manner to the accessory 100*g*. In particular, the first suction head 144*g* is illustrated in a state in which it has been released in a tool-free manner from the accessory 100*g* and changed over for a closure element 150*g*. The first suction head 114*g* is preferably connected to the accessory 100*g* via the same mechanical interface 151*g* as the closure element 150*g*. The closure element 150*g* closes the first air channel 106*g* such that it is no longer possible for any air stream to penetrate into the first air channel 106*g*. In addition the closure element 150*g* is advantageously of compact design such that the insertion tool 1000 is not enclosed by the closure element 150*g* and the accessory 100*g* can be operated with the telescopic unit in the retracted and arrested state. If there is no need for any suction extraction at the drill hole, the closure element can advantageously achieve a higher suction-extraction performance in the second air channel 108*g*. In addition, the second suction head 116*g* is illustrated in a state in which it has been released, with the further hose element 130*g*, from the accessory 100*g* and changed over for a further closure element 152*g*. The further closure element 152*g* is designed, for example, in the form of a plug, which closes the second air channel 108*g*. As an alternative, the closure element 152*g* can also have the same interface 153*g*, for mechanical fastening on the accessory 100*g*, as the hose element 130*g*. If use is not being made of an insertion tool 1000 designed in the form of a suction drill bit, then it is advantageously possible for the second suction head 116*g* and the hose element 130*g* to be changed over for the further closure element 152*g* and for the second air channel 108*g* to be closed. This has the advantage of increasing the suction-extraction performance in the first air channel 106*g* and of simplifying the handling of the accessory 100*g*.

What is claimed is:

1. An accessory for a hand-held power tool, comprising:
   a first air channel, in which a first air stream for transporting dust particles is routed into a dust-collecting box, the first air channel having a first end adjacent to a drill bit such that the first end directly receives dust particles exiting from a drill hole formed by the drill bit; and
   a second air channel, in which a second air stream for transporting dust particles is routed into one of the dust-collecting box and a further dust-collecting box, the second air channel being partially defined by a hollow portion of the drill bit.

2. The accessory according to claim 1, wherein:
   an inlet region of the first air channel is movable relative to an inlet region of the second air channel along an axial direction of the drill bit.

3. The accessory according to claim 1, wherein:
   the first air channel and the second air channel open out in a common air channel upstream of the dust-collecting box, as seen in the flow direction of the air stream.

4. The accessory according to claim 1, wherein:
   at least one of the first air stream and the second air stream is generated by a fan unit, which has at least one fan element.

5. The accessory according to claim 4, wherein:
   the fan unit also has a further fan element, and
   the fan element and the further fan element differ in terms of their fan characteristic curves.

6. The accessory according to claim 5, wherein:
   at least one of the fan element and the further fan element is arranged in the hand-held power tool.

7. The accessory according to claim 5, wherein:
   the fan element and the further fan element are driven by an electric motor of the hand-held power tool.

8. The accessory according to claim 4, wherein:
   at least the fan element of the fan unit is arranged in the accessory.

9. The accessory according to claim 1, wherein:
   a volumetric flow rate in at least one of the first air channel and the second air channel is regulatable or controllable between at least two nonzero volumetric flow rates.

10. The accessory according to claim 9, wherein:
    at least one of the first air stream and the second air stream is generated by a fan unit, which has at least one fan element; and
    the fan unit is configured such that a characteristic fan curve of the at least one fan element is adjustable.

11. The accessory according to claim 9, wherein:
    at least one of the first air channel and the second air channel has an adjustment element configured to reduce a flow cross section in the at least one of the first air channel and the second air channel or to block at least one of the first air stream and the second air stream in the at least one of the first air channel and the second air channel.

12. The accessory according to claim 1, wherein:
at least one of the first air channel and the second air channel is connected in a releasable manner to the accessory in such a way that the at least one of the first air channel and the second air channel is releasable in a tool-free manner.

13. A hand-held power tool, comprising:
a drill bit having a hollow portion; and
an accessory, including:
  a first air channel, in which a first air stream for transporting dust particles is routed into a dust-collecting box, the first air channel having a first end adjacent to the drill bit such that the first end directly receives dust particles exiting from a drill hole formed by the drill bit; and
  a second air channel, in which a second air stream for transporting dust particles is routed into one of the dust-collecting box and a further dust-collecting box, the second air channel being partially defined by a hollow portion of the drill bit.

14. The hand-held power tool according to claim 13, wherein:
at least one of the first air stream and the second air stream is generated by a fan unit, which has at least one fan element.

15. The hand-held power tool according to claim 14, wherein:
the fan unit also has a further fan element, and
the fan element and the further fan element differ in terms of their fan characteristic curves.

16. The hand-held power tool according to claim 15, wherein:
at least one of the fan element and the further fan element is arranged in the hand-held power tool.

17. The hand-held power tool according to claim 15, wherein:
the fan element and the further fan element are driven by an electric motor of the hand-held power tool.

18. The hand-held power tool according to claim 14, wherein:
at least the fan element of the fan unit is arranged in the accessory.

19. The hand-held power tool according to claim 13, wherein:
at least one of the first air channel and the second air channel is connected in a releasable manner to the accessory in such a way that the at least one of the first air channel and the second air channel is releasable in a tool-free manner.

20. The hand-held power tool according to claim 13, further comprising:
a power tool housing,
wherein the accessory further comprises an accessory housing in which the dust-collecting box is arranged, the accessory housing being releasably attached to the power tool housing in a tool-free manner.

* * * * *